(12) United States Patent
Takikawa et al.

(10) Patent No.: US 8,830,524 B2
(45) Date of Patent: Sep. 9, 2014

(54) IMAGE FORMING APPARATUS, IMAGE FORMING METHOD, AND PROGRAM

(71) Applicant: Canon Kabushiki Kaisha, Tokyo (JP)

(72) Inventors: Yoichi Takikawa, Kawasaki (JP); Hideki Kubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/734,831

(22) Filed: Jan. 4, 2013

(65) Prior Publication Data

US 2013/0120807 A1 May 16, 2013

Related U.S. Application Data

(63) Continuation of application No. PCT/JP2011/053111, filed on Feb. 15, 2011, and a continuation of application No. 13/166,597, filed on Jun. 22, 2011, now Pat. No. 8,373,902.

(30) Foreign Application Priority Data

Feb. 18, 2010 (JP) .................................. 2010-033792

(51) Int. Cl.
*H04N 1/40* (2006.01)
*H04N 1/04* (2006.01)
*G03G 15/00* (2006.01)
*H04N 1/409* (2006.01)
*B41J 2/47* (2006.01)

(52) U.S. Cl.
CPC ....... *H04N 1/04* (2013.01); *G03G 2215/00042* (2013.01); *G03G 15/50* (2013.01); *H04N 1/409* (2013.01); *B41J 2/471* (2013.01)

USPC ............................................. 358/1.9; 358/406

(58) Field of Classification Search
USPC ................... 358/1.9, 2.1, 400, 500, 406, 504, 358/3.03–3.05
See application file for complete search history.

(56) References Cited

U.S. PATENT DOCUMENTS 4,310,757 A * 1/1982 Check et al. ................... 250/236
2004/0223195 A1* 11/2004 Nomura ........................ 358/509

FOREIGN PATENT DOCUMENTS

| EP | 1450198 A2 | * | 8/2004 |
| JP | 2005177268 A | * | 7/2005 |
| JP | 2006-168241 A | | 6/2006 |
| JP | 2006-305954 A | | 11/2006 |

* cited by examiner

*Primary Examiner* — Thomas D Lee
*Assistant Examiner* — Stephen M Brinich
(74) *Attorney, Agent, or Firm* — Canon USA Inc. IP Division

(57) ABSTRACT

Banding can be prevented and image-quality degradation can be reduced. An image processing apparatus includes first creation means configured to distribute density of image data to a pixel on another scanning line on the basis of a difference between an actual print position of the image data and a reference position and to create position-corrected image data, second creation means configured to correct the image data using a correction value corresponding to a position of the image data and to create density-corrected image data, and generation means configured to generate output image data using the position-corrected image data created by the first creation means and the density-corrected image data created by the second creation means.

20 Claims, 11 Drawing Sheets

IMAGE FORMING APPARATUS, IMAGE FORMING METHOD, AND PROGRAM

CROSS-REFERENCE TO RELATED APPLICATIONS

This application is a Continuation of application Ser. No. 13/166,597, filed Jun. 22, 2011, which is a Continuation of International Patent Application No. PCT/JP2011/053111, filed Feb. 15, 2011, which claims priority from Japanese Patent Application No. 2010-033792, filed Feb. 18, 2010, each of which are hereby incorporated by reference herein in their entirety.

BACKGROUND OF THE INVENTION

1. Field of the Invention

The present invention relates to a technique for suppressing horizontal bands (banding) resulting from a gradation of density.

2. Description of the Related Art

Hitherto, image forming apparatuses, such as electrophotographic printers, expose a photosensitive member to a laser beam that is controlled in accordance with an image signal, thereby forming an electrostatic latent image corresponding to the image signal on the photosensitive member. The image forming apparatuses then develop and transfer the formed electrostatic latent image on recording media, such as paper, thereby forming an output image. Such image forming apparatuses have a problem that shifting of a print position is caused by various factors and significantly damages the quality of images.

For example, when unevenness occurs in rotation speed of an image bearing member, such as a photosensitive member, a position in a sub scanning direction, in which the image bearing member is scanned with a laser beam or the like, shifts and unevenness is caused in intervals between sub scanning lines. Because of this, horizontal bands (hereinafter, referred to as banding) resulting from a gradation of density are caused in an output image. More specifically, even if uniform exposure is attempted over the whole surface of the photosensitive member, an amount of exposure in a predetermined area decreases and the density decreases because the scan-line interval widens at high rotation speed. Additionally, since the scan-line interval narrows at low rotation speed, the amount of exposure in the predetermined area increases and the density increases.

As a first method for solving such a problem, a method for correcting density of input image data in consideration of density unevenness information that is previously detected (e.g., Japanese Patent Laid-Open No. 11-112810) has been proposed. In addition, as a second method, a method for correcting a position of image data in consideration of a print-position shifting characteristic (e.g., U.S. Pat. No. 6,625,331) has been proposed.

CITATION LIST

Patent Literature

PTL 1: Japanese Patent Laid-Open No. 11-112810
PTL 2: U.S. Pat. No. 6,625,331

The foregoing methods, however, significantly degrade the image quality when images having a specific characteristic are corrected. With the first method, texture is caused at high-frequency part of the images because of an interference between halftone processing and density correction processing. Additionally, with the second method, uneven sharpness is caused and the unevenness stands out particularly in low-frequency part.

SUMMARY OF THE INVENTION

An image forming apparatus of the present invention includes first creation means configured to distribute density of image data to a pixel on another scanning line on the basis of a difference between an actual print position of the image data and a reference position and to create position-corrected image data, second creation means configured to correct the image data using a correction value corresponding to a position of the image data and to create density-corrected image data, and generation means configured to generate output image data using the position-corrected image data created by the first creation means and the density-corrected image data created by the second creation means.

Further features of the present invention will become apparent from the following description of exemplary embodiments with reference to the attached drawings.

DESCRIPTION OF THE EMBODIMENTS

Preferred embodiments of the present invention will be described in detail below with reference to the attached drawings.

First Embodiment

Figure 1:
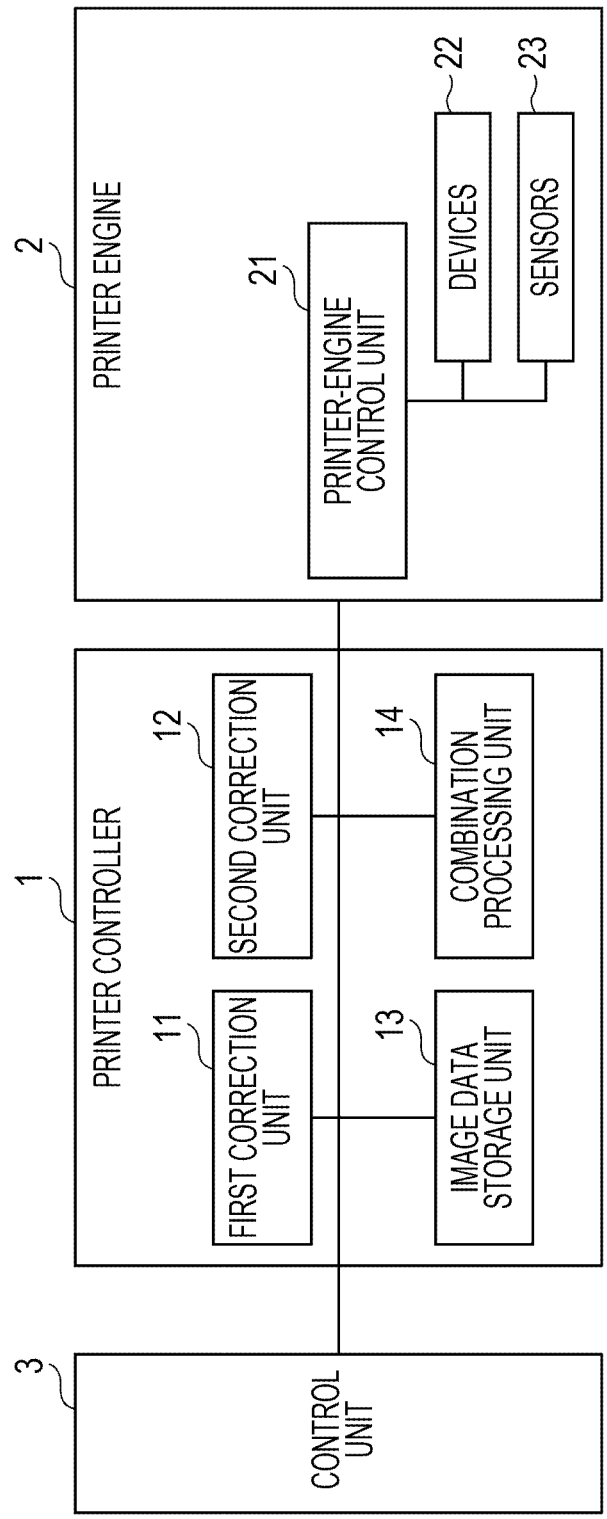
FIG. 1 is a block diagram illustrating an example of a configuration of an image forming apparatus according to an embodiment.

FIG. 1 is a block diagram illustrating an example of a configuration of an image forming apparatus 100 according to this embodiment.

In FIG. 1, the image forming apparatus 100 includes a printer controller 1, a printer engine 2, and a control unit 3.

The printer controller 1 includes a first correction unit 11, a second correction unit 12, an image data storage unit 13, and a combination processing unit 14. The printer controller 1 performs correction processing for suppressing horizontal bands (banding) caused by a gradation of density in an output image. Additionally, the printer controller 1 transmits and receives control commands, information, and so forth to and from the printer engine 2, respectively, and also transmits image data thereto.

The printer engine 2 includes a printer-engine control unit 21, devices 22, and sensors 23. Here, the devices 22 include motors for use in driving of image bearing members and a paper conveying system. The sensors 23 include a temperature sensor, a humidity sensor, a density sensor, a speed sensor, a position sensor, and so forth. The printer-engine control unit 21 controls the devices 22 in accordance with information input from the printer controller 1 and information from the sensors 23. Additionally, the control unit 3 includes interfaces to be connected to a hard disk drive, a personal computer, a server, a network, and so forth, not illustrated. The control unit 3 outputs image data to the printer controller 1.

Figure 2:
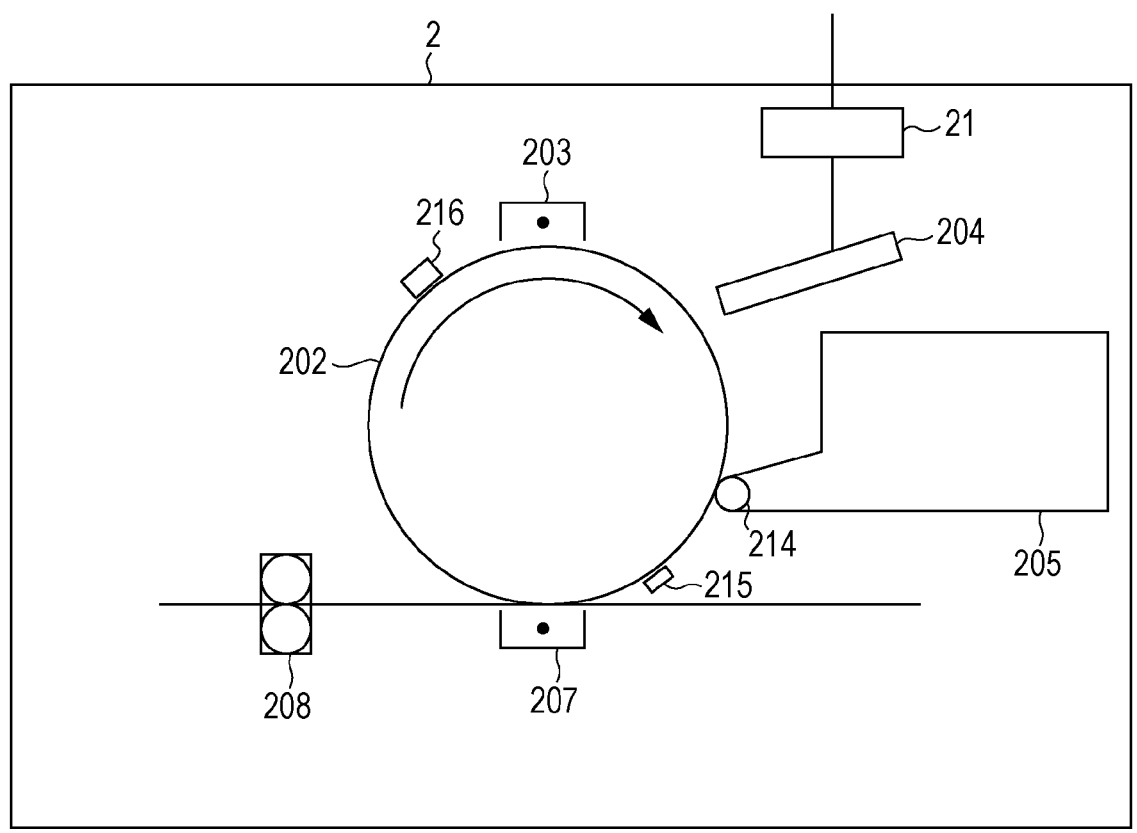
FIG. 2 is a diagram illustrating an example of a detailed configuration of a printer engine according to an embodiment.

FIG. 2 is a diagram illustrating an example of a detailed configuration of the printer engine 2 in FIG. 1.

In FIG. 2, a charger 203 charges a photosensitive drum 202. A laser scanner 204 drives a semiconductor laser in accordance with input image data to emit a laser beam. The laser beam is reflected on a rotating polygon mirror and scans the photosensitive drum 202 to form a latent image. A developing unit 205 develops the latent image recorded on the photosensitive drum 202 and forms a toner image on the photosensitive drum 202. A transfer unit 207 transfers the toner image formed on the photosensitive drum 202 onto a recording medium, such as paper. A fixing unit 208 fixes the toner image having been transferred on the recording medium with heat and pressure. A developing sleeve 214 is disposed to face the photosensitive drum 202. A density sensor 215 measures density of a patch developed on the photosensitive drum 202. A speed sensor 216 measures rotation speed of the photosensitive drum 202.

Additionally, a mark M1, not illustrated, is formed on a surface of the photosensitive drum 202. This mark M1 is formed, for example, outside an image forming region (a region where an electrostatic latent image and a toner image can be formed) of the photosensitive drum 202. A phase sensor, not illustrated, for detecting this mark M1 is also disposed to face the photosensitive drum 202. The phase sensor detects the mark M1 every time the photosensitive drum 202 makes one rotation.

For ease of explanation, only a single image forming station (including the photosensitive drum 202, the charger 203, the developing unit 205, and so forth) is illustrated in FIG. 2 in this embodiment. In a case of an image forming apparatus forming color images, image forming stations for respective colors, e.g., cyan, magenta, yellow, and black, are sequentially arranged on the transfer unit 207 along a traveling direction. Additionally, the developing units 205 for the respective colors may be arranged around one photosensitive drum 202 or the developing units 205 for the respective colors may be disposed on a rotatable casing. In either case, the intended developing unit 205 is disposed to face the photosensitive drum 202 to develop an image in intended color.

Figure 3:
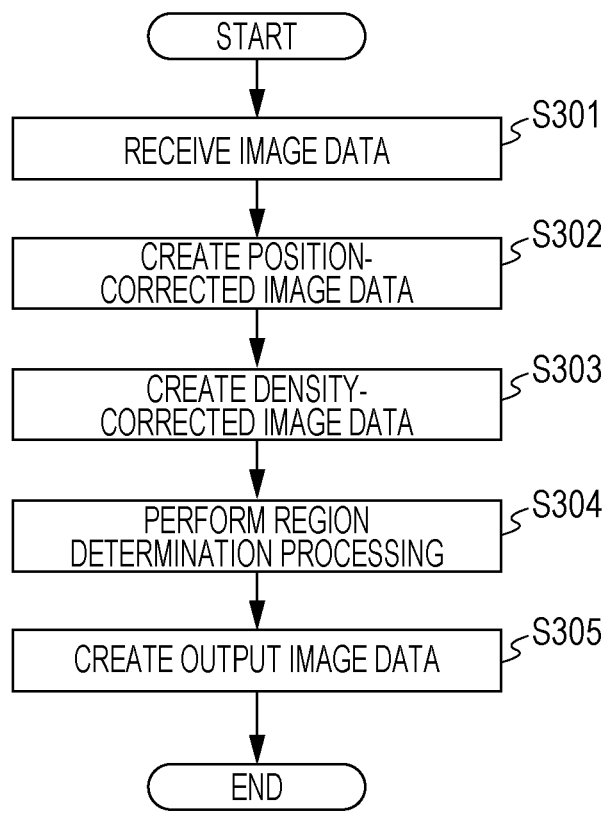
FIG. 3 is a flowchart illustrating an example of a procedure of creating output image data.
Figure 7A:
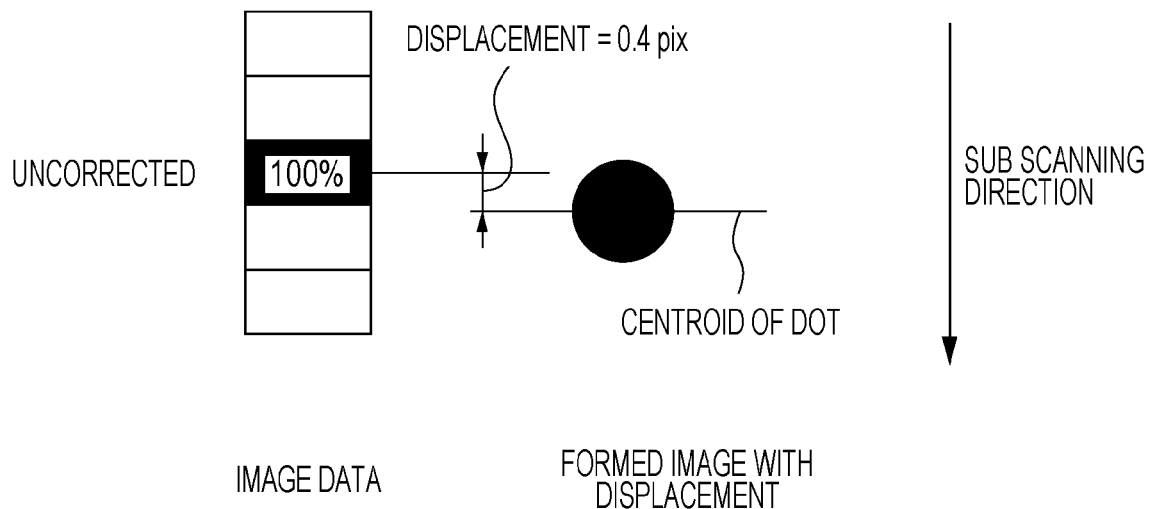
FIGS. 7A and 7B are a diagram describing banding correction processing performed in a first correction unit.
Figure 7B:
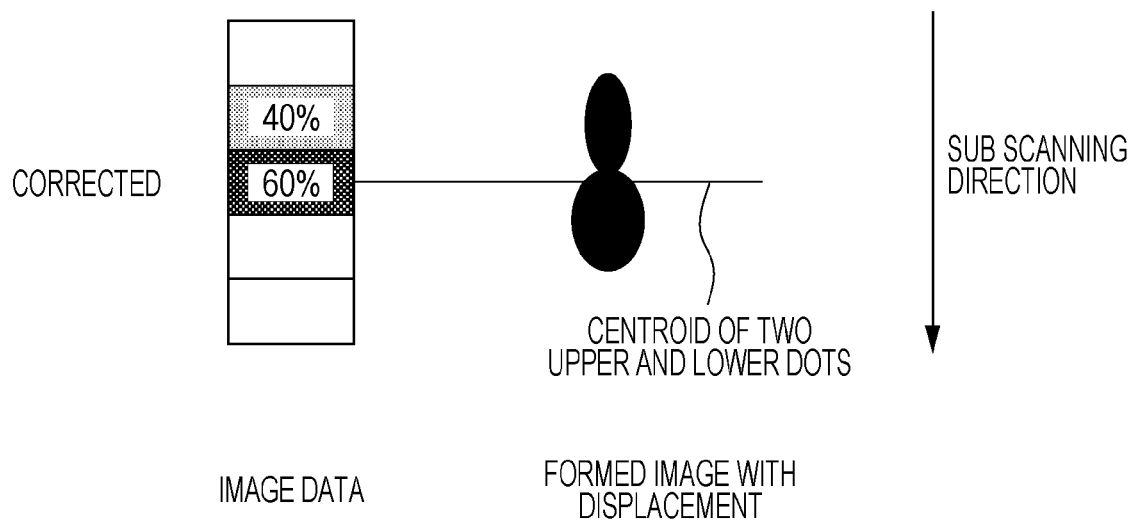

FIG. 3 is a flowchart illustrating a procedure of correcting banding performed by the image forming apparatus 100. First, in step S301, the printer controller 1 receives image data from the control unit 3 and stores the image data in the image data storage unit 13. Next, in step S302, the first correction unit 11 creates position-corrected image data. Details of the banding correction processing performed in the first correction unit 11 will be described using FIGS. 7A and 7B. The banding correction processing is performed on each pixel of the image data. Here, an example case of correcting a pixel having a shift amount of 0.4 times of one-pixel width as illustrated in FIG. 7A will be described. In this example, 40% of a density level of a correction-target pixel is distributed to an adjacent pixel in a direction opposite to a print-position shifting direction of the correction-target pixel. In this way, a position of a centroid of a combination of a printed dot corresponding to the correction-target pixel and a printed dot corresponding to the adjacent pixel matches a reference position as illustrated in FIG. 7B. The reference position is a print position of the correction-target pixel when the photosensitive drum 202 uniformly rotates at predetermined rotation speed. As described above, a dot is formed at an intended position by moving the position of the correction-target pixel by a reciprocal of the shift amount. In accordance with this method, even when the shift amount is not integral multiple of the one-pixel width and a position after the movement extends over tow pixels, it is possible to virtually move the position of the centroid by an amount less than the one-pixel width and make the print position virtually match the reference position by appropriately distributing the density level of the correction-target pixel to the two pixels.

A concrete processing method of the position-correction-based banding correction processing performed in the first correction unit 11 will be described below.

When the banding correction described using FIGS. 7A and 7B is performed, a sum of density values distributed to a processing-target i-th scanning line has to be calculated in order to determine a pixel value of the i-th scanning line. In this embodiment, a banding-corrected pixel value (Ycor(j)) is calculated by distributing a pixel value (Y(j)) of each scanning line of the input image data on the basis of a difference (Dst(i,j)) between the reference position (Xref(i)) and a corrected position (Xcor(j)) in a sub scanning direction as described below. Meanwhile, the sub scanning direction corresponds to a rotation direction of the photosensitive drum.

First, the corrected position in the sub scanning direction is calculated from an actual position in the sub scanning direction on a correction-target j-th scanning line and the reference position. The actual position on the correction-target j-th scanning line can be detected in a following manner. The speed sensor 216 of the printer engine 2 detects rotation speed of the photosensitive drum 202. At this time, a position on a peripheral surface of the photosensitive drum 202 (a position in the sub scanning direction) is associated with the rotation speed by synchronizing timing that the phase sensor detects the mark M1 with the detected rotation speed. The actual position in the sub scanning direction is then calculated using the rotation speed data associated with the position on the peripheral surface of the photosensitive drum 202.

$$Xcor(j)=Xref(j)-(Xerr(j)-Xref(j))$$

Xref(j) denotes the reference position in the sub scanning direction corresponding to the pixel on the j-th scanning line. Xerr(j) denotes the print position (the actual position) in the sub scanning direction of the pixel on the j-th scanning line. Xcor(j) is the corrected position in the sub scanning direction of the pixel on the j-th scanning line. Xcor(j) is a position in the sub scanning direction in the image data in consideration of a shift caused in a process.

Next, the difference (Dst(i,j)) between the corrected position on the j-th scanning line and the reference position corresponding to the pixel on the i-th scanning line is calculated.

$$Dst(i,j)=|Xref(i)-Xcor(j)|$$

A percentage for distributing the pixel value on the j-th scanning line to a pixel at the same scanning position on the i-th scanning line is calculated based on the calculated Dst(i, j). A pixel at the same scanning position is a pixel at the same position in a main scanning direction.

$$cvr(i,\ j) = \begin{cases} 1 - Dis(i,\ j) & (\text{if } Dis(i,\ j) < 1) \\ 0 & (\text{otherwise}) \end{cases}$$

Here, when Dst(i,j) is not less than 1, it indicates that the corrected position (Xcor(j)) is not close to Xref(i). Accordingly, the distribution percentage is set to 0.

A binding-corrected pixel value (Ycor(i)) is calculated by distributing the pixel value (Y(j)) on each scanning line of the input image data to the pixel at the same scanning position on the i-th scanning line using the calculated Cvr(i,j). The processing for calculating Ycor(i) is performed for each pixel and uses the pixel value Y(j) on the j-th scanning line at the same scanning position as that of Ycor(i).

$$Ycor(i) = \Sigma(Crv(i,j) * Y(j))$$

Here, Σ indicates adding results calculated with j being changed.

Meanwhile, calculation of the actual position using the phase sensor and calculation of Cvr(i,j) using the actual position do not have to be performed in real time of creating the position-corrected image data in step S302. Calculation of the actual position using the phase sensor and calculation of Cvr(i,j) using the actual position are performed at times satisfying a given condition, such as when the printer engine 2 is turned on and every time a predetermined number of pieces of paper are printed, and the calculated Cvr(i,j) is stored. In step S302, the processing for calculating Ycor(i) from the image data is performed using the stored Cvr(i, j).

Next, in step S303, the second correction unit 12 performs density-correction-based banding correction processing to create density-corrected image data.

The second correction unit 12 reads out a previously stored density correction value corresponding to a position on the photosensitive drum in accordance with the position of the processing-target pixel and adds the density correction value to the processing-target pixel.

A method for creating the previously stored density correction value corresponding to the position on the photosensitive drum will be described below.

Figure 8A:
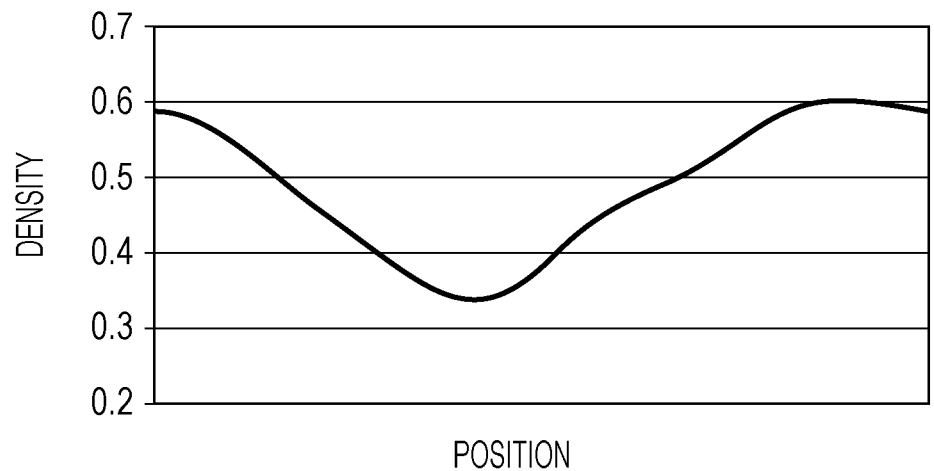
FIGS. 8A and 8B are a diagram illustrating an example of a density profile.

Correction image data for calculating a correction amount is first created. The created correction image data is then output to the printer engine 2. A toner image is formed on the photosensitive drum 202. Creation of a density profile is performed next. FIG. 8A is an example of the created density profile. First, density of the toner image formed on the photosensitive drum 202 is detected by the density sensor 215. Timing that the phase sensor detects the mark M1 is synchronized with the detected density, so that the position on the peripheral surface of the photosensitive drum 202 is associated with the density and the density profile is created.

Figure 8B:
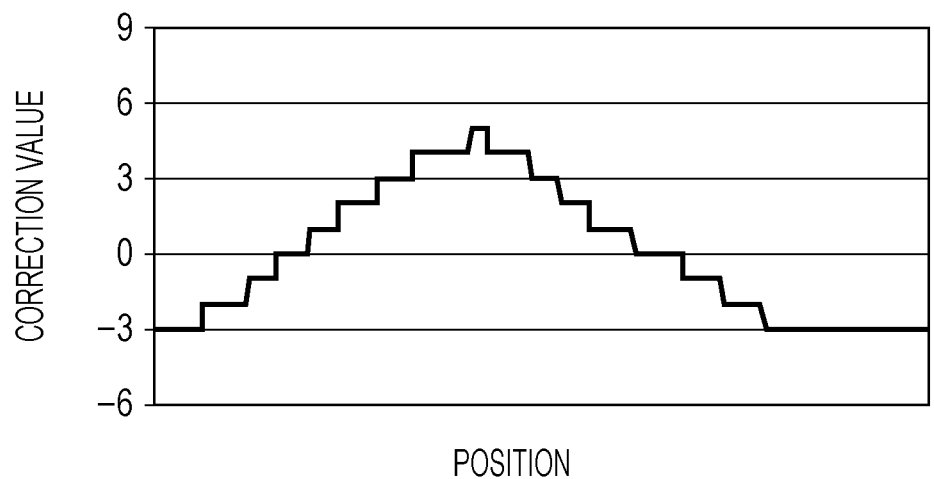

Next, a density value of the density profile is converted into a correction value using a previously stored conversion table. FIG. 8B is a correction value created from the density profile illustrated in FIG. 8A. The second correction unit 12 increases or decreases the pixel value of the image in accordance with a caused density variation, thereby canceling the density variation and forming an image in intended density. The correction value is data indicating an amount of the increase or the decrease in the pixel value at each position. Accordingly, as illustrated in FIGS. 8A and 8B, the correction value is a large value in the correction data when the density is at a low position in the density profile. That is, the pixel value at this position is corrected in the correction processing so that the pixel value decreases. In this way, it is possible to cancel the density variation by correcting the image data in accordance with the caused density variation and to create an image in intended density.

Meanwhile, the density-correction-based banding processing is not limited to processing for adding correction values. The density variation may be canceled by calculating a coefficient corresponding to the position based on the density profile and multiplying the pixel value by the coefficient.

The above-described processing for creating the position-corrected image data and for creating the density-corrected image data significantly degrades image quality when images having a specific characteristic are corrected.

Figure 9A:
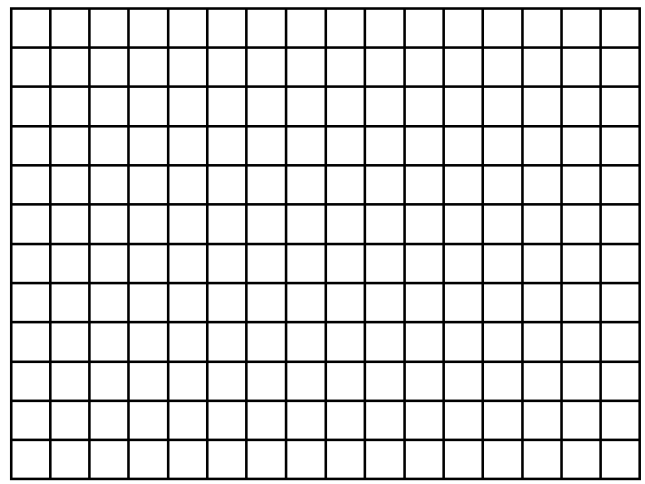
FIGS. 9A and 9B are diagrams describing image-quality degradation caused by processing for creating position-corrected image data.
Figure 9B:
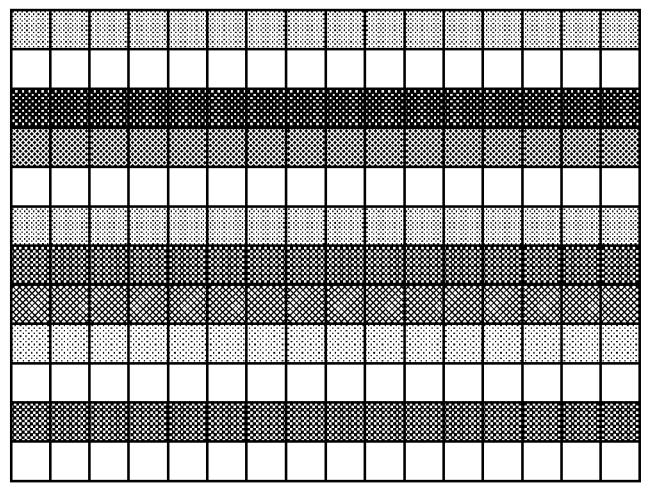

Image-quality degradation caused by the processing for creating the position-corrected image data will be described below using FIGS. 9A and 9B. The image-quality degradation stands out particularly when the processing for creating the position-corrected image data is performed on a low-frequency image, such as one illustrated in FIG. 9A. In this case, density unevenness illustrated in FIG. 9B is caused in the created position-corrected image data and the unevenness stands out also in a formed image.

Image-quality degradation caused by the processing for creating the density-corrected image data will be described below using FIGS. 10A to 10E. The image-quality degradation stands out particularly when the processing for creating the density-corrected image data is performed on a high-frequency image, such as one illustrated in FIG. 10A.

Figure 10A:
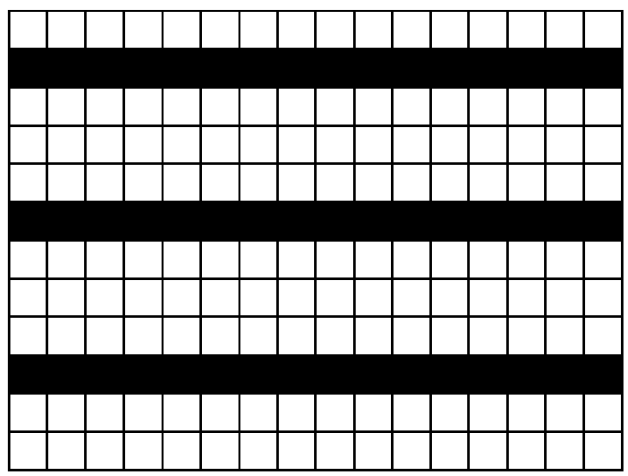
FIGS. 10A to 10E are diagrams describing image-quality degradation caused by processing for creating density-corrected image data.
Figure 10B:
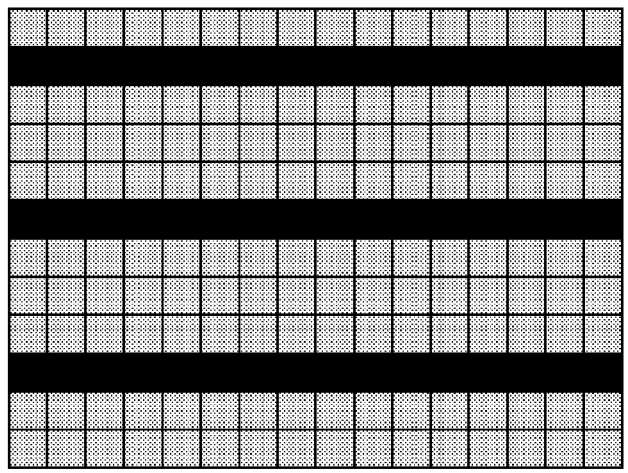
Figure 10C:
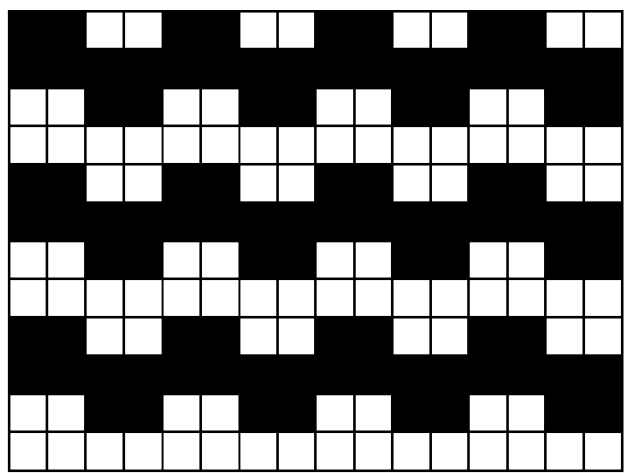

As an example, when density decreases because of the caused density variation, the created density-corrected image data is corrected to be darker than the input image as illustrated in FIG. 10B. FIG. 10C is an image obtained by performing halftone processing on this density-corrected image data. Since a region whose density has been 0% has a positive density value because of the correction, a dot is caused in that region of a halftone image.

Figure 10D:
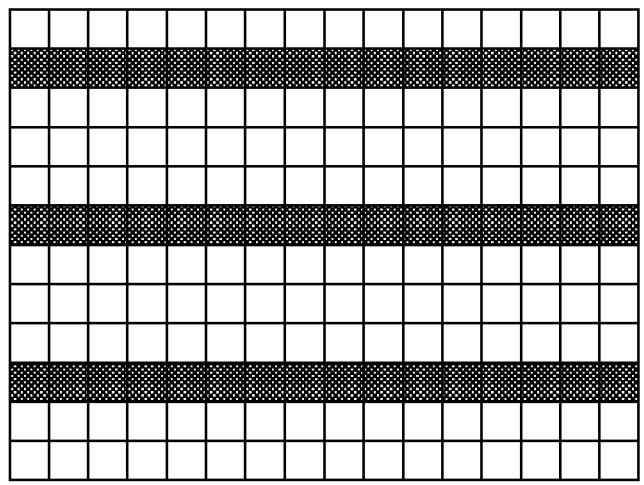
Figure 10E:
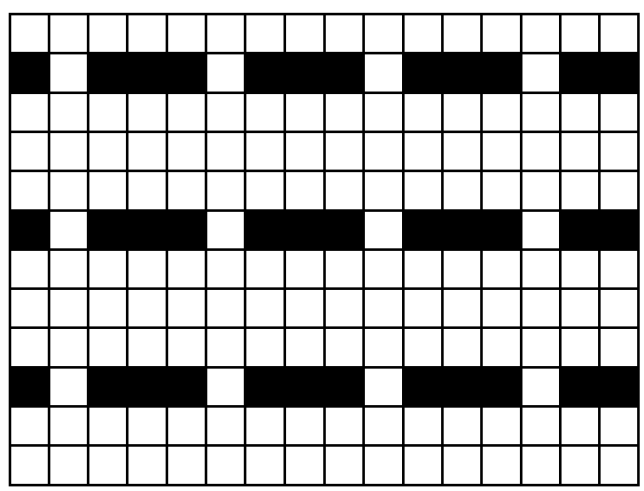

As another example, when density increases because of the caused density variation, the created density-corrected image data is corrected to be lighter than the input image as illustrated in FIG. 10D. FIG. 10E is an image obtained by performing the halftone processing on this density-corrected image data. Since a density of 100% decreases because of the correction, some dots in the region disappear in the halftone image. As illustrated above, texture that does not exist in the input image is visually confirmed because the dots appear or disappear by performing the halftone processing on each corrected image data.

In either case, the above-described image-quality degradation resulting from the processing for creating the position-corrected image data and the processing for creating the density-corrected image data stands out only when images having a specific characteristic are corrected. The image-quality degradation resulting from the processing for creating the position-corrected image data stands out in low-frequency images but is rare in high-frequency images. The image-quality degradation resulting from the processing for creating the density-corrected image data stands out in high-frequency images but is rare in low-frequency images.

Accordingly, in this embodiment, the image is divided into a plurality of blocks. Determination of a feature value, i.e., a special frequency, is performed in each block. Based on the determination result, correction processing causing little image-quality degradation is adopted.

Returning to the description of FIG. 3, the combination processing unit 14 next performs region determination processing of the input data in step S304. Here, an example of an algorithm of the region determination processing will be described with reference to a flowchart of FIG. 4.

Figure 4:
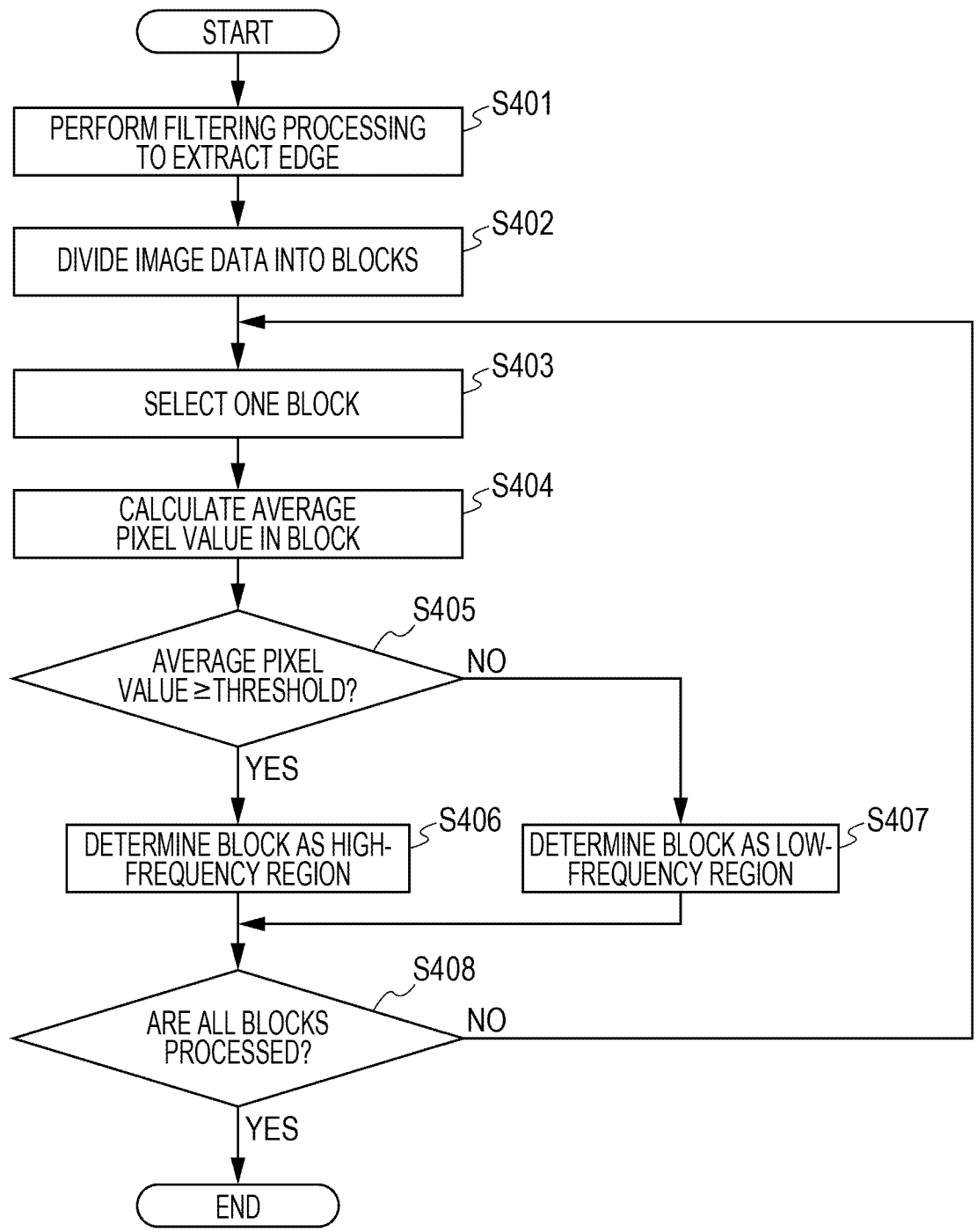
FIG. 4 is a flowchart illustrating an example of a procedure of region determination of image data.

FIG. 4 is a flowchart illustrating an example of a procedure of determining a region of image data by the combination processing unit 14.

First, in step S401, Laplacian filtering processing is performed on the image data received in step S301. Although the Laplacian filter is used in this embodiment, the filter is not limited to the Laplacian and any filter may be used as long as the filter extracts an edge.

Next, in step S402, the combination processing unit 14 divides the filtering-processed image data into a plurality of blocks. Next, in step S403, the combination processing unit 14 selects one block from the plurality of divided blocks. In step S404, the combination processing unit 14 then calculates an average pixel value of the selected block. Next, in step S405, the combination processing unit 14 compares the calculated average pixel value with a predetermined threshold. When the calculated average pixel value is equal to or larger than the threshold (equal to or larger than a predetermined value) as a result of this comparison, the process proceeds to S406 and the combination processing unit 14 determines that the block is a high-frequency region. On the other hand, when the average pixel value is smaller than the threshold (smaller than the predetermined value) as a result of the comparison of step S405, the process proceeds to step S407 and the combination processing unit 14 determines the block as a low-frequency region.

Next, in step S408, the combination processing unit 14 determines whether the region determination is performed on all blocks. When there is an unprocessed block on which the region determination is not performed as a result of this determination, the process returns to step S403. On the other hand, when the region determination has been performed on all blocks as a result of step S408, the process terminates. Although the region determination processing is performed using the average pixel value in this embodiment, the region determination processing may be performed by comparing a value, such as a highest pixel value, with a threshold. Additionally, the region determination processing may be performed using an attribute of an object of the image data without performing the block division processing. In this case, for example, the combination processing unit 14 functions as acquiring means and acquires attribute information of the object from the image data. A region whose object attribute is a character/thin line is determined as a high-frequency region, whereas a region whose object attribute is a portrait is determined as a low-frequency region, and so forth.

Returning to the description of FIG. 3, in step S305, the combination processing unit 14 creates output image data next. Here, an algorithm for creating the output image data is performed in a following procedure, for example. First, masking processing for passing only blocks that are determined as the high-frequency regions in step S304 is performed on the position-corrected image data created in step S302 and high-frequency-corrected image data is created. Next, masking processing for passing only blocks that are determined as the low-frequency regions in step S304 is performed on the density-corrected image data created in step S303 and a low-frequency-corrected image data is created. Lastly, the combination processing unit 14 combines the high-frequency-corrected image data and the low-frequency-corrected image data to create the output image data. The printer engine 2 performs printing processing by transferring this output image data onto recording media, such as paper.

As described above, in accordance with this embodiment, the position-correction-based banding correction processing is performed on high-frequency image regions, whereas the density-correction-based banding correction processing is performed on low-frequency image regions. In this way, it is possible to suppress banding in an output image and reduce the image-quality degradation caused by the banding correction processing.

Second Embodiment

An example of dividing image data into blocks and selecting a correction method for each block has been described in the first embodiment. In this embodiment, a description will be given for an example of predicting image-quality degradation caused when printing is performed after each correction processing and selecting a correction method causing little image-quality degradation. Meanwhile, since configurations of the image forming apparatus according to this embodiment are similar to those of FIG. 1 and FIG. 2 having been described in the first embodiment, a description is omitted.

Figure 5:
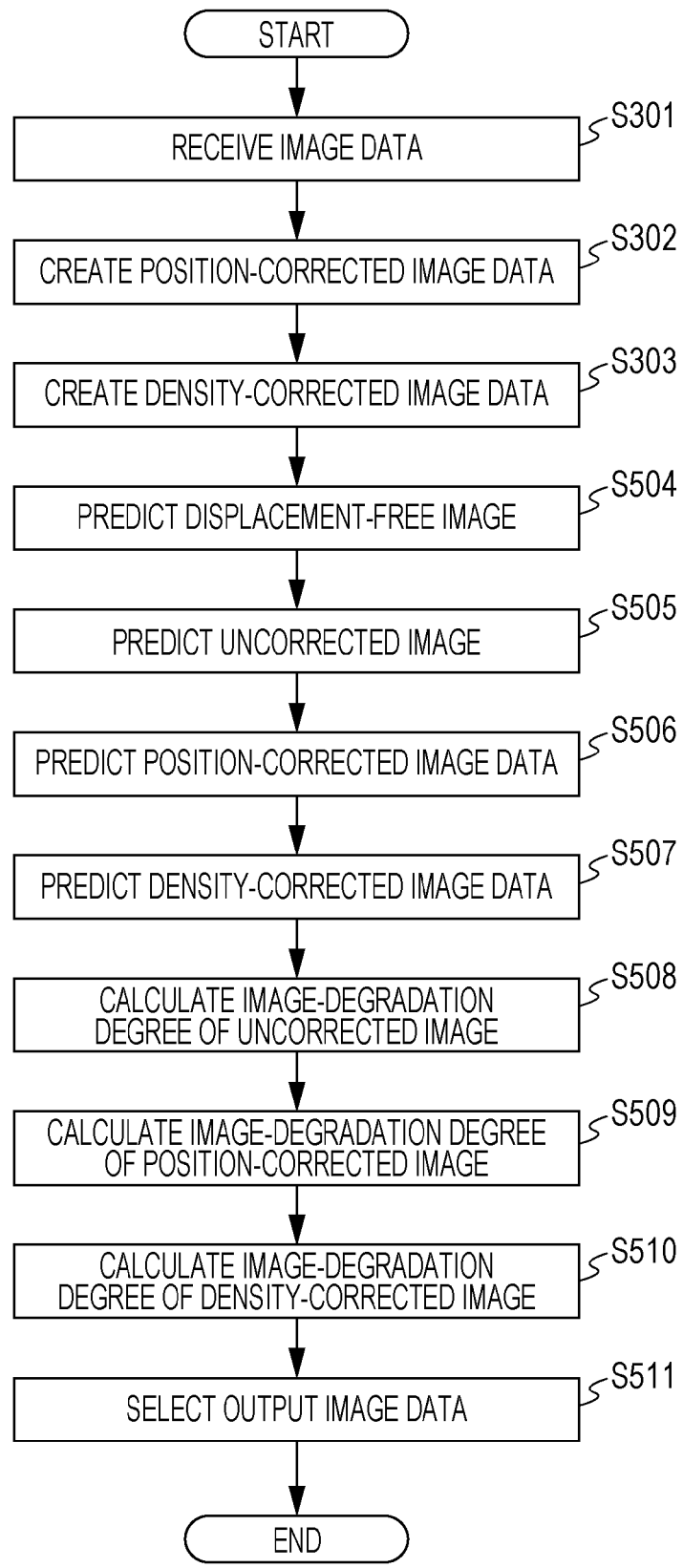
FIG. 5 is a flowchart illustrating an example of a procedure of creating output image data.

FIG. 5 is a flowchart illustrating an example of a procedure of creating image data that is corrected so that banding is not caused in this embodiment. Although methods for correcting a print position and density will be described as methods for correcting the image data in this embodiment for ease of the following explanation, the methods are not limited to these and three or more methods may be used. Additionally, since steps S301 to S303 of FIG. 5 are similar to steps S301 to S303 of FIG. 3 having been described in the first embodiment, a description is omitted.

Next, in step S504, a combination processing unit 14 predicts a print image (a print result) of image data received in step S301 with a following algorithm under a condition that shifting of a print position is not caused. More specifically, the combination processing unit 14 predicts positions and shapes of dots formed on a medium, such as paper, using the image data received in step S301 and characteristic information, such as a previously stored output method and an output condition of a printer engine 2. The predicted result is then stored in an image data storage unit 13 as first predicted image data.

Next, in step S505, the combination processing unit 14 predicts a print image of the image data received in step S301 with a following algorithm under a condition that shifting of the print position is caused. More specifically, the combination processing unit 14 uses the image data received in step S301, data regarding the shift amount of the print position created in step S302, and the characteristic information, such as the previously stored output method and the output condition of the printer engine 2. The combination processing unit 14 predicts positions and shapes of dots formed on a medium, such as paper, using these pieces of data and stores the predicted result in the image data storage unit 13 as second predicted image data.

Next, in step S506, the combination processing unit 14 predicts a print image of the position-corrected image data with a following algorithm under a condition that shifting of the print position is caused. More specifically, the combination processing unit 14 uses the position-corrected image data, the data regarding the shift amount of the print position created in step S302, and the characteristic information, such as the previously stored output method and the output condition of the printer engine 2. The combination processing unit 14 predicts positions and shapes of dots formed on a medium, such as paper, using these pieces of data and stores the predicted result in the image data storage unit 13 as third predicted image data.

Next, in step S507, the combination processing unit 14 predicts a print image of the density-corrected image data with a following algorithm under a condition that shifting of the print position is caused. More specifically, the combination processing unit 14 uses the density-corrected image data, the data regarding the shift amount of the print position created in step S302, and the characteristic information, such as the previously stored output method and the output condition of the printer engine 2. The combination processing unit 14 predicts positions and shapes of dots formed on a medium, such as paper, using these pieces of data and stores the predicted result in the image data storage unit 13 as fourth predicted image data.

Next, in step S508, the combination processing unit 14 calculates an image-quality degradation degree (a first image-quality degradation degree) of the print image (the second predicted image data) predicted in step S505. A procedure of calculating the image-quality degradation degree is performed based on, for example, an algorithm described below. First, an absolute value of a difference between a pixel value of the print image predicted in step S505 (the second predicted image data) and a pixel value of the print image predicted in step S504 (the first predicted image data) is calculated for every pixel. An average of the calculated absolute values of the differences of the pixel values is calculated. The calculated average is used as the image-quality degradation degree. Although the second predicted image data is compared with the print image predicted in step S504 and the average of the absolute values of the differences of the pixel values is calculated in this embodiment when the image-quality degradation degree is calculated, values, such as a maximum value, a minimum value, and an intermediate value, may be used instead of the average value. Additionally, instead of the predicted print image, frequency characteristics of the predicted print image and so forth may be compared.

Next, in step S509, the combination processing unit 14 calculates an image-quality degradation degree (a second image-quality degradation degree) of the print image predicted in step S506 (the third predicted image data). Since an algorithm for calculating the image-quality degradation degree is similar to that in step S508, a detailed description is omitted. In step S510, the combination processing unit 14 then calculates an image-quality degradation degree (a third image-quality degradation degree) of the print image predicted in step S507 (the fourth predicted image data). Since an algorithm for calculating the image-quality degradation degree is similar to that in step S508, a detailed description is omitted.

Next, in step S511, the combination processing unit 14 selects output image data. In this embodiment, the output image data is selected based on a following algorithm. First, the first image-quality degradation degree calculated in step S508, the second image-quality degradation degree calculated in step S509, and the third image-quality degradation degree calculated in step S510 are compared. When the first image-quality degradation degree calculated in step S508 is the smallest as a result of this comparison, the image data input in step S301 is selected as the output image data. On the other hand, when the second image-quality degradation degree calculated in step S509 is the smallest as a result of the comparison, the position-corrected image data created in step S302 is selected as the output image data. Furthermore, when the third image-quality degradation degree calculated in step S510 is the smallest as a result of the comparison, the density-corrected image data created in step S303 is selected as the output image data.

As described above, in accordance with this embodiment, image data that minimizes the image-quality degradation degree is selected. In this way, it is possible to suppress banding in an output image and reduce the image-quality degradation caused by banding correction processing.

Third Embodiment

A method for dividing image data into a plurality of blocks and selecting a correction method for each block has been described in the first embodiment. Additionally, an example of predicting image-quality degradation caused when image data is printed after each correction processing and selecting a correction method causing the least image-quality degradation has been described in the second embodiment. In this embodiment, an example of dividing image data into high-frequency components and low-frequency components and selecting a correction method for each type of components will be described. Meanwhile, since configurations of an image forming apparatus according to this embodiment is similar to those of FIG. 1 and FIG. 2 having been described in the first embodiment, a description is omitted.

Figure 6:
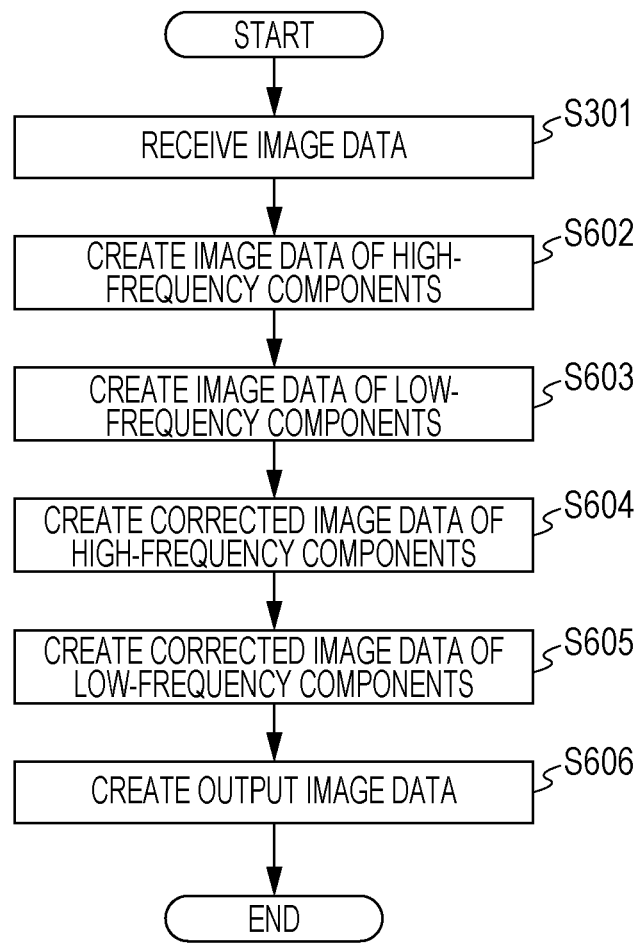
FIG. 6 is a flowchart illustrating an example of a procedure of creating output image data.

FIG. 6 is a flowchart illustrating an example of a procedure of creating image data that is corrected so that banding is not caused in this embodiment. Meanwhile, since step S301 of FIG. 6 is similar to step S301 of FIG. 3 having been described in the first embodiment, a description is omitted. Next, in step S602, a combination processing unit 14 performs Laplacian filtering processing on image data received in step S301 to create image data of high-frequency components. Meanwhile, the Laplacian filter is used in this embodiment but the filter is not limited to the Laplacian and any filter may be used as long as the filter extracts an edge. Next, in step S603, the combination processing unit 14 functions as separating means and determines a difference between the image data received in step S301 and the image data of the high-frequency components created in step S602 to create image data of low-frequency components.

Next, in step S604, a first correction unit 11 performs position correction processing on the image data of the high-frequency components created in step S602 to create corrected image data of high-frequency components. Meanwhile, since a detail of the position correction processing is similar to that in the first embodiment, a detailed description is omitted. In step S605, a second correction unit 12 performs density correction processing on the image data of low-frequency components created in step S603 to create corrected image data of low-frequency components. Meanwhile, since a detail of the density correction processing is similar to that in the first embodiment, a detailed description is omitted. In step S606, the combination processing unit 14 then adds the corrected image data of high-frequency components created in step S604 to the corrected image data of low-frequency components created in step S605 to create output image data.

As described above, in accordance with this embodiment, a high-frequency region is corrected using position-corrected image data in which a position of a pixel is moved, whereas a low-frequency region is corrected using density-corrected image data in which print density is changed. In this way, it is possible to prevent an interference between halftone processing and density correction processing from causing texture in the high-frequency region and prevent unevenness from standing out as horizontal bands in the low-frequency region. That is, it is possible to reduce the image-quality degradation resulting from banding correction.

Other Embodiments

The present invention is also realized by providing a system or an apparatus with a recording medium storing a program code of software realizing functions of the above-described embodiments (e.g., functions illustrated by the flowcharts of FIG. 3 to FIG. 6). In this case, a computer (or a CPU or an MPU) of the system or the apparatus reads out the program code stored on the computer-readable recording medium and executes the program code, thereby realizing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus which scans and irradiates a photosensitive member which is rotated in a sub scanning direction, by moving a laser beam according to image data in a main scanning direction, develops a latent image formed on the photosensitive member with the laser beam, and transfers the developed latent image to a recording medium, the image forming apparatus comprising:
    an acquiring unit configured to acquire output image data created by combining first image data and second image data, the first image data being obtained by correcting image data by distributing, based on a shifting of a print position, each pixel value of the image data to pixels of a plurality of scanning lines, and the second image data being obtained by correcting the image data using a correction value according to a position in the sub scanning direction of the image data; and
    a driving unit configured to drive the laser beam in accordance with the output image data.

2. The image forming apparatus according to claim 1, further comprising:
    an irradiation unit configured to irradiate the photosensitive member with a laser beam via an optical system,
    wherein the driving unit is configured to drive the irradiation unit based on the output image data.

3. The image forming apparatus according to claim 1, wherein the acquiring unit selects the first image data for image data of a high-frequency image region, and selects the second image data for image data in a low-frequency image region.

4. The image forming apparatus according to claim 1, wherein the first image data is obtained such that a centroid position of dots obtained by distributing a pixel value of a target pixel is shifted, by an amount of the shifting of a print position, in the sub scanning direction of the photosensitive member which corresponds to the target pixel included in the image data.

5. The image forming apparatus according to claim 1, wherein the second image data is obtained by correcting the image data such that a density variation caused in the sub scanning direction of the photosensitive member is canceled out.

6. The image forming apparatus according to claim 1, wherein the shifting of a print position is performed in the sub scanning direction.

7. The image forming apparatus according to claim 1, wherein the shifting of a print position is set based on an actual position and a reference position in the sub scanning direction on the photosensitive member scanned with the laser beam.

8. The image forming apparatus according to claim 1, wherein the shifting of a print position is calculated when the image forming apparatus is turned on.

9. The image forming apparatus according to claim 1, wherein the shifting of a print position is calculated every time predetermined number of pieces of recording medium are printed.

10. An image forming method for an image forming apparatus which scans and irradiates a photosensitive member which is rotated in a sub scanning direction, by moving a laser beam according to image data in a main scanning direction, develops a latent image formed on the photosensitive member with the laser beam, and transfers the developed latent image to a recording medium, the image forming method comprising:
    acquiring output image data created by combining first image data and second image data, the first image data being obtained by correcting image data by distributing, based on a shifting of a print position, each pixel value of the image data to pixels of a plurality of scanning lines, and the second image data being obtained by correcting the image data using a correction value according to a position in the sub scanning direction of the image data; and
    driving the laser beam in accordance with the output image data.

11. An image forming apparatus which scans and irradiates a photosensitive member which is rotated in a sub scanning direction, by moving a laser beam according to image data in a main scanning direction, develops a latent image formed on the photosensitive member with the laser beam, and transfers the developed latent image to a recording medium, the image forming apparatus comprising:
    an acquiring unit configured to acquire output image data created by combining first image data and second image data, the first image data being obtained by correcting image data by distributing, using a distribution ratio determined based on an amount of a shifting of a print position in the sub scanning direction of the image data, each pixel value of the image data to pixels of a plurality of scanning lines, and the second image data being obtained by correcting the image data using a correction value according to a position in the sub scanning direction of the image data; and
    a driving unit configured to drive the laser beam in accordance with the output image data.

12. The image forming apparatus according to claim 11, wherein the distribution ratio is set such that a centroid position of dots is shifted according to the amount of the shifting of the print position.

13. The image forming apparatus according to claim 11, wherein the distribution ratio is set with respect to each position of the sub scanning direction.

14. An image forming apparatus which scans and irradiates a photosensitive member which is rotated in a sub scanning direction, by moving a laser beam according to image data in a main scanning direction, develops a latent image formed on the photosensitive member with the laser beam, and transfers the developed latent image to a recording medium, the image forming apparatus comprising:
    an acquiring unit configured to acquire output image data created by combining first image data and second image data, the first image data being obtained by correcting image data by distributing, based on a shifting of a print position, each pixel value of the image data to pixels of a plurality of scanning lines, and the second image data being obtained by correcting the image data using a correction value according to a position in the sub scanning direction of the image data, wherein the correction value is determined by a density value of a density profile created based on a result of detection of a toner image formed on the photosensitive member; and a driving unit configured to drive the laser beam in accordance with the output image data.

15. The image forming apparatus according to claim 14, wherein the second image data is obtained by correcting pixel values of the image data using the correction value and then performing halftone processing.

16. An image forming apparatus which scans and irradiates a photosensitive member which is rotated in a sub scanning direction, by moving a laser beam according to image data in a main scanning direction, develops a latent image formed on the photosensitive member with the laser beam, and transfers the developed latent image to a recording medium, the image forming apparatus comprising:

an acquiring unit configured to acquire output image data wherein image data is composed of pixels each of which has either a pixel value being obtained by correcting image data by distributing, based on a shifting of a print position, each pixel value of image data to pixels of a plurality of scanning lines, or a pixel value being obtained by correcting image data using a correction value according to a position in the sub scanning direction; and a driving unit configured to drive the laser beam in accordance with the output image data.

17. The image forming apparatus according to claim 16, wherein, in the output image data, each of values of pixels composing a high-frequency region is obtained by correcting image data by distributing, based on a shifting of a print position, each pixel value of image data to pixels of a plurality of scanning lines.

18. An image forming method for an image forming apparatus which scans and irradiates a photosensitive member which is rotated in a sub scanning direction, by moving a laser beam according to image data in a main scanning direction, develops a latent image formed on the photosensitive member with the laser beam, and transfers the developed latent image to a recording medium, the image forming method comprising:

acquiring output image data created by combining first image data and second image data, the first image data being obtained by correcting image data by distributing, using a distribution ratio determined based on an amount of a shifting of a print position in the sub scanning direction of the image data, each pixel value of the image data to pixels of a plurality of scanning lines, and the second image data being obtained by correcting the image data using a correction value according to a position in the sub scanning direction of the image data; and driving the laser beam in accordance with the output image data.

19. An image forming method for an image forming apparatus which scans and irradiates a photosensitive member which is rotated in a sub scanning direction, by moving a laser beam according to image data in a main scanning direction, develops a latent image formed on the photosensitive member with the laser beam, and transfers the developed latent image to a recording medium, the image forming method comprising:

acquiring output image data created by combining first image data and second image data, the first image data being obtained by correcting image data by distributing, based on a shifting of a print position, each pixel value of the image data to pixels of a plurality of scanning lines, and the second image data being obtained by correcting the image data using a correction value according to a position in the sub scanning direction of the image data, wherein the correction value is determined by a density value of a density profile created based on a result of detection of a toner image formed on the photosensitive member; and driving the laser beam in accordance with the output image data.

20. An image forming method for an image forming apparatus which scans and irradiates a photosensitive member which is rotated in a sub scanning direction, by moving a laser beam according to image data in a main scanning direction, develops a latent image formed on the photosensitive member with the laser beam, and transfers the developed latent image to a recording medium, the image forming method comprising:

acquiring output image data wherein image data is composed of pixels each of which has either a pixel value being obtained by correcting image data by distributing, based on a shifting of a print position, each pixel value of image data to pixels of a plurality of scanning lines, or a pixel value being obtained by correcting image data using a correction value according to a position in the sub scanning direction; and driving the laser beam in accordance with the output image data.

* * * * *